United States Patent Office 3,334,284
Patented Aug. 1, 1967

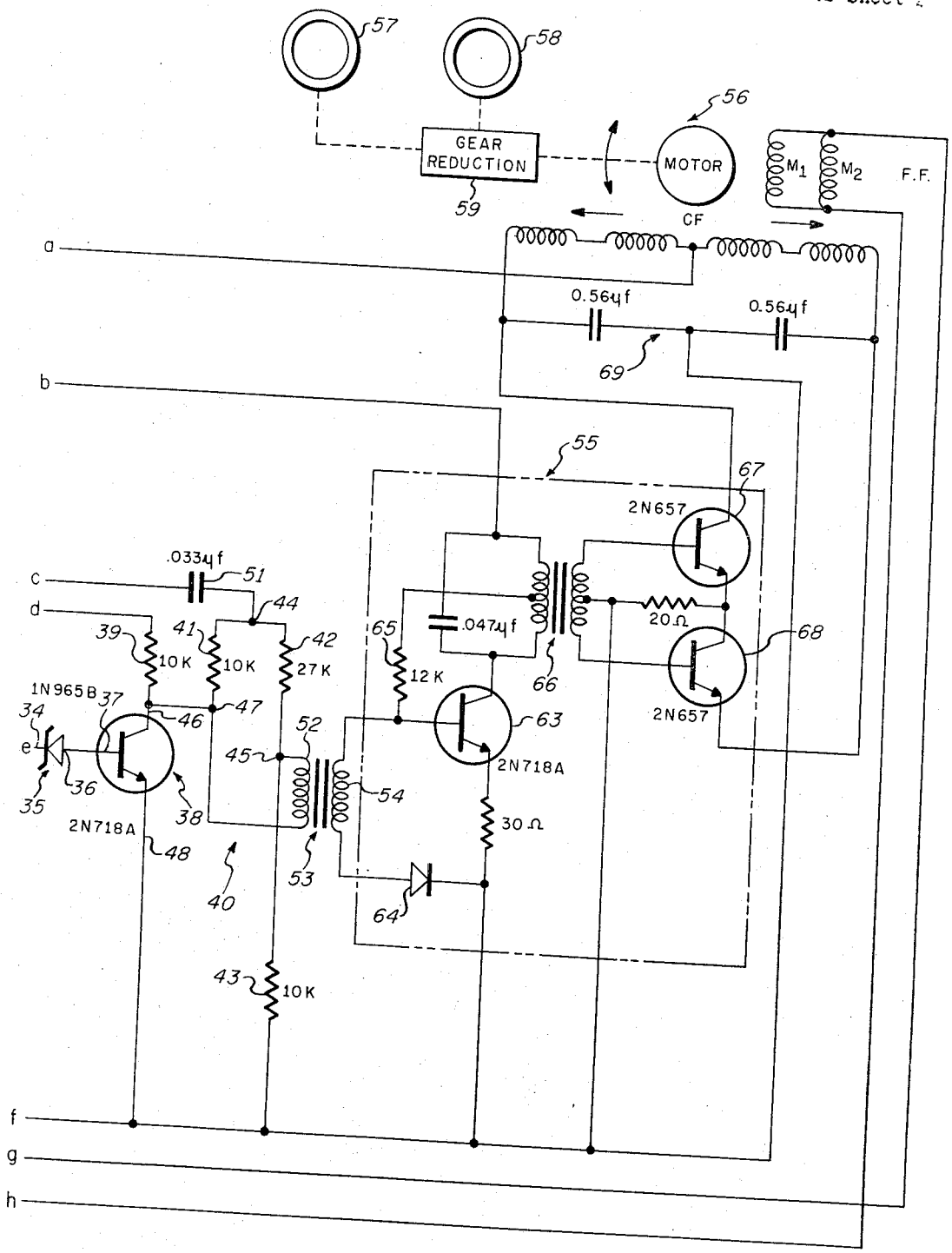

3,334,284
SOLID STATE TIMING AND REVERSING CIRCUIT
Richard K. Radtke, Phoenix, Ariz., assignor to Sperry Rand Corporation, Great Neck, N.Y., a corporation of Delaware
Filed Jan. 4, 1965, Ser. No. 423,062
4 Claims. (Cl. 318—281)

ABSTRACT OF THE DISCLOSURE

A solid state timing and reversing circuit including a bridge circuit having electronic bistable switch means in only one leg of the bridge circuit for periodically reversing the direction of current flow to a motor to reverse its direction of rotation periodically.

---

Figure 1A:
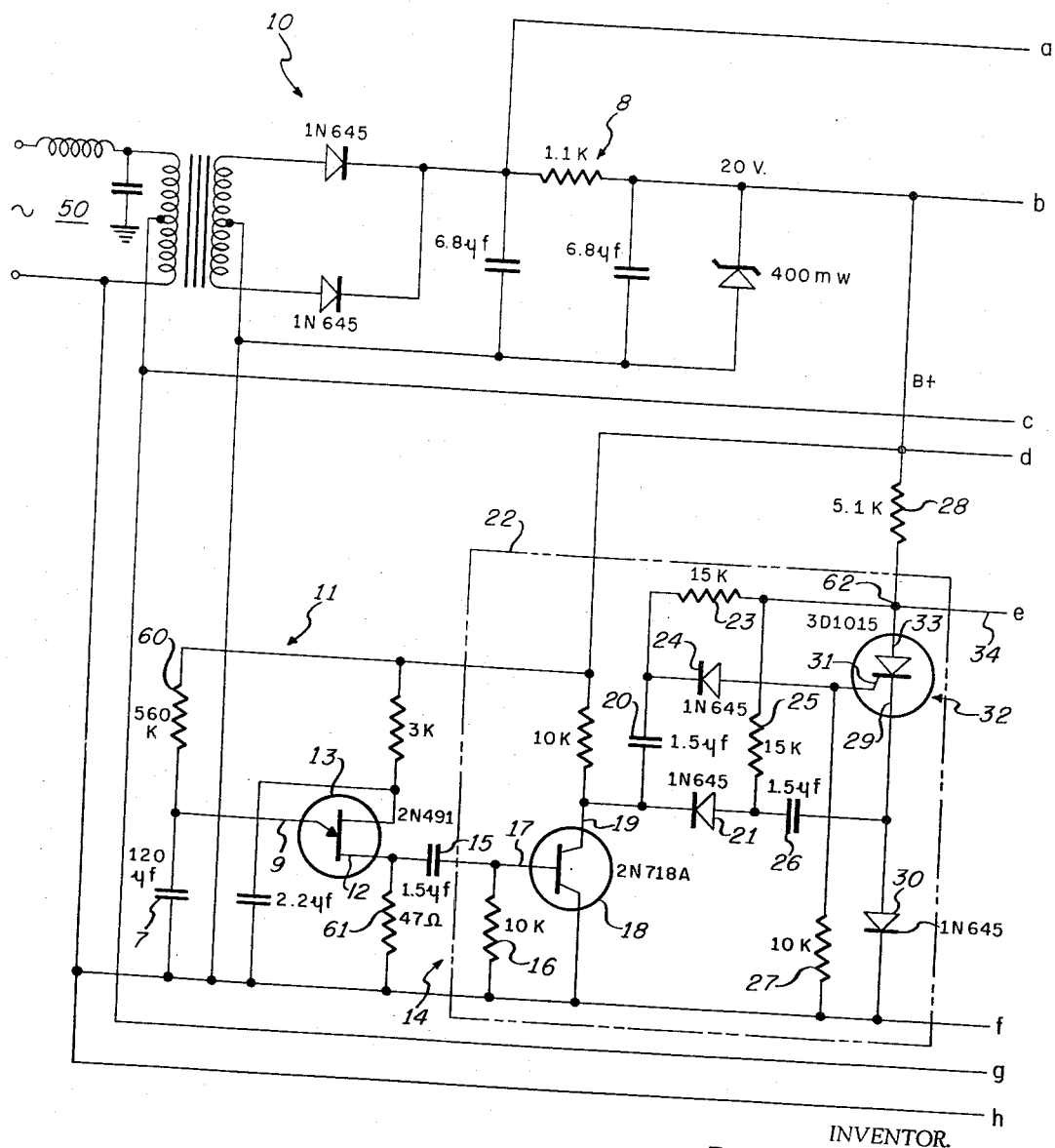

The present invention relates to a solid state timing and reversing circuit and it is particularly applicable to periodically reversing the direction of rotation of a motor.

As explained in U.S. Patent No. 2,970,480, entitled "Anti-Friction Support Mechanism for Gyroscopic Devices," issued Feb. 7, 1961, to Zeigler et al., the accuracy of a gyroscopic instrument is defined as a certain level of drift rate of the gyro spin axis in inertial space. This undesirable gyro drift is caused by torques inadvertently applied to the gyroscope. The torques about the gyro suspension axis are the most difficult to control, particularly those caused by the support bearings. As explained in the aforementioned U.S. Patent 2,970,480, the drift rate can be appreciably reduced by rotating each bearing of a pair of bearings in a direction opposite to the other for several revolutions and periodically and simultaneously reversing the direction of rotation of both bearings by means of a motor which has its direction of rotation periodically reversed by a timing and reversing device.

Previously and as shown in said U.S. Patent No. 2,970,480, the timing and reversing device utilized a mechanical relay which was subject to problems inherent to mechanical relays including sticking, changing characteristics with age, and wearing out. In contrast, the present invention provides a solid state timing and reversing circuit which elminates the problems associated with mechanical relays thereby substantially improving the overall means time between failures as compared with the previously described mechanical relay device.

It is an object of the present invention to provide a solid state timing and reversing device for periodically reversing the direction of rotation of a motor.

It is an additional object of the present device to provide a solid state timing and reversing apparatus which overcomes the limitations of mechanical timing and reversing apparatus.

The present invention achieves the above objects by utilizing an electronic timer which actuates an electronic bistable switch from one condition to another. The bistable switch is disposed in one leg of an A.C. bridge circuit for controlling current to flow through the bridge output in one direction or the other depending upon the condition of the bistable switch. With the output of the A.C. bridge circuit connected to control a motor that drives the gyro bearings, the direction of rotation of the motor is periodically reversed thereby causing periodic reversal of the direction of rotation of the gyro bearings with the timing symmetry remaining constant.

These and other objects of the invention will become apparent by referring to the drawing, comprising FIGS. 1a and 1b which in combination is a schematic wiring diagram of a solid state timing and reversing circuit connected to a motor that drives a pair of gyro bearings.

Referring to the drawing, a solid state timing and reversing circuit 10 includes a unijunction transistor relaxation oscillator 11 of the type shown in General Electric Control Rectifier Manual, First Edition, Page 52, FIG. 4.9. The relaxation oscillator 11 has a capacitor 7 connected to a regulated D.C. supply 8 and to the unijunction transistor emitter electrode 9 in order to provide periodic pulses from the base-1 electrode 12 of the unijunction transistor 13 in a manner to be more fully explained. The base-1 electrode 12 is connected through an RC coupling circuit 14 comprising a series capacitor 15 and a shunting resistor 16 to the base electrode 17 of a transistor 18. The collector 19 of the transistor 18 is connected to a capacitor 20 and to the cathode of a crystal rectifier 21 of a trigger pulse steering and shaping network 22. The capacitor 20 in turn is connected to a resistor 23 and to the cathode of a crystal rectifier 24. The anode of the rectifier 21 is connected to a resistor 25 and a capacitor 26 while the anode of the rectifier 24 is connected to a resistor 27 and to the gate electrode 31 of a silicon controlled rectifier 32. The capacitor 26 is connected to the cathode 29 of the rectifier 32 and to the anode of a crystal rectifier 30. The junction of the resistors 23 and 25 is connected to the anode 33, to a resistor 28 and to the cathode 34 of a Zener diode 35 by means of a junction 62. The Zener diode 35 in turn has its anode 36 connected to the base 37 of a transistor 38. The transistor 38 is connected in one leg of an A.C. bridge circuit 40, in a manner to be more fully described.

The A.C. bridge circuit 40 forms a Wheatstone bridge having four arms that are interconnected in a known manner. In the embodiment shown, the impedance devices of the bridge 40 comprise resistors 41, 42 and 43 disposed in respective legs of the bridge and the transistor 38 and a shunting resistor 39 disposed in the fourth leg of the bridge. One extremity of the resistor 41 and one extremity of the resistor 42 are connected at an input junction 44 while the other extremity of the resistor 42 is connected to one extremity of the resistor 43 at an output junction 45. The other extremity of the resistor 41 is connected to the collector 46 of the transistor 38 and to the resistor 39 at an output junction 47 while the other extremity of the resistor 43 and the emitter 48 of the transistor 38 are connected to a common potential. An A.C. source 50 is connected through a capacitor 51 to the input junction 44.

The primary 52 of a transformer 53 has its input terminals connected to the output junctions 45 and 47. The secondary 54 of the transformer 53 is connected to an amplifier 55 which in turn is connected to the split control field windings of an induction motor 56. The induction motor 56 is connected to drive a pair of gyroscopic bearings 57 and 58 in opposite directions with respect to each other by means of a gear reduction 59 in a manner similar to that explained in detail in said U.S. Patent 2,970,480.

In operation, it is assumed that the silicon controlled rectifier 32 is initially off, the capacitor 26 is charged to B+, for example, about 20 v., the capacitor 20 is uncharged due to an equo-potential on each plate, and the collector 19 of the transistor 18 and the anode of the silicon controlled rectifier (SCR) 32 are both at B+. The capacitor 7 is charged through the resistor 60 until the emitter voltage of the unijunction transistor 13 reaches a predetermined voltage, at which time the unijunction transistor 13 turns on and discharges the capacitor 7 through the resistor 61. This causes the capacitor 15 to charge and provide a positive pulse at the base 17 of the transistor 18. This causes the B+ potential at the collector 19 of the transistor 18 to drop to approximately 0.1 volt for the duration of the pulse. The instant the transistor 18 turns on, the charge on the capacitor 26 appears as a positive potential to the gate electrode 31 of the SCR 32 through the circuit from the capacitor 26, through the rectifier 21, the transistor 18, and the resistor 27 to the gate 31. This positive potential at the gate 31 turns on the SCR 32. In this condition, the transistor 18 may be considered a closed switch, the anode 33 of the SCR 32 is approximately 1 v. in the on condition, and the capacitor 20 charges to about 19 v. (B+ minus 1 v. on anode 33). The transistor 18 turns off at the expiration of the pulse while the SCR 32 continues to conduct.

With the next positive pulse from the relaxation oscillator 11, the transistor 18 is again turned on causing the voltage at its collector 19 to drop to approximately 0.1 v. for the duration of the pulse. The capacitor 20 now is provided with a discharge path through the rectifier 24, the transistor 18 and the resistor 27. This diverts the current from the gate electrode 31 of the SCR 32 causing the SCR 32 to turn off. The reason for this is that the SCR 32 is the electrical equivalent of interconnected PNP and NPN transistors and diverting the normal PNP transistor current from the base (actually the gate electrode 31 of SCR 32) electrode of the equivalent NPN transistor causes the SCR 32 to turn off.

The aforementioned cycle is repeated with the next positive pulse from the relaxation oscillator 11 thereby providing a square wave signal at the junction 62 having an upper limit of 20 v. when SCR 32 is not conducting and a lower limit of 1 v. when SCR 32 is conducting with the period defined by the relaxation oscillator 11. The network 22 may thus be considered a type of square wave generator.

The transistor 38 may be considered a bistable switch which is turned on and off depending upon the state of the SCR 32. The transistor 38 and the resistor 39 are in parallel with respect to each other and form one leg of the A.C. bridge 40. With the transistor 38 not conducting, the bridge 40 is unbalanced in one direction to produce an in-phase voltage across the primary 52 of the transformer 53. With the transistor 38 conducting, the bridge 40 is unbalanced in the other direction to produce an out-of-phase voltage across the primary 52 in a manner to be more fully explained.

With SCR 32 off, the transistor 38 in the bridge circuit 40 is on thereby presenting a low impedance path to the current flow which unbalances the A.C. bridge 40 to provide an out-of-phase voltage across the primary 52 of the transformer 53. This voltage is amplified in the amplifier 55 to drive the induction servomotor 56 in a counter-clockwise direction for a predetermined time interval, for example, 30 seconds.

The output of the A.C. bridge 40 is coupled through the primary 52 to the input of the transistor 63 which is biased Class A by a stabistor 64 and a resistor 65. The resistor 65 provides both AC and DC feedback for amplifier stabilization. The output of the transistor 63 is transformer coupled by transformer 66 to transistors 67 and 68 which are both biased Class B. The transistors 67 and 68 are directly connected to B+ and to the split control field winding 69 of the induction motor 56.

With the SCR 32 on, the transistor 38 in the bridge circuit 40 is turned off because the base electrode 37 of the transistor 38 is negative. This unbalances the A.C. bridge 40 to produce an in-phase voltage across the primary 52 of the transformer 53. This voltage when amplified in the amplifier 55 drives the induction motor 56 in a clockwise direction for an equal predetermined time interval which depends upon the time constant of the relaxation oscillator 11 whereupon the cycle then automatically repeats itself. By means of the present invention, symmetrical timing pulses are provided wherein the timing symmetry remains constant even though the period itself may change, which results in very effective bearing friction averaging, as explained in said U.S. Patent 2,970,480.

FIGURES 1a and 1b show representative values for the electrical components which have been found suitable for a particular application of the present invention.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. A solid state reversing circuit for periodically reversing the direction of rotation of a motor driving gyroscope bearings by periodically reversing the direction of current flow of its power supply comprising,
   (1) A.C. bridge circuit means having its input connected to said power supply,
   (2) said bridge circuit means having four legs with first, second, third, and fourth resistors disposed in first, second, third, and fourth legs, respectively, and a transistor connected in parallel with said fourth resistor in said fourth leg by means of its collector and emitter electrodes, said transistor also having a base electrode,
   (3) means including a relaxation oscillator for providing periodic pulses which are applied to said base for causing said transistor to act as an electronic bistable switch whereby in a first condition said transistor is effectively a low impedance path and in a second condition it is effectively a very high impedance path,
   (4) a transformer having its primary connected to the output of said bridge circuit and its secondary coupled to said motor, and
   (5) said bridge circuit being so constructed and arranged that with said transistor in its first condition current flows primarily through said transistor and through said transformer primary in a first direction and with said transistor in its second condition, the current flows primarily through said fourth resistor and through said primary in an opposite direction whereby the rotation of said motor is periodically reversed.

2. A solid state reversing circuit for periodically reversing the direction of rotation of a motor driving gyroscope bearings by periodically reversing the direction of current flow of its power supply comprising,
   (1) unijunction transistor relaxation oscillator means for providing pulses having a predetermined periodicity,
   (2) square wave generating means responsive to said periodic pulses for providing a square wave output having predetermined upper and lower limits and a duration defined by said pulse periodicity,
   (3) A.C. bridge circuit means having four legs with first, second, third, and fourth resistors disposed in first, second, third, and fourth legs respectively and a transistor connected in parallel with said fourth resistor in said fourth leg,
   (4) transformer means having its primary connected to the output of said bridge circuit means and its secondary coupled to said motor, and
   (5) said transistor being responsive to said square wave whereby said transistor provides a low impedance path during the duration of the upper limit of said square wave and current flows through said transformer primary in a first direction and said transistor provides an extremely high impedance path during the duration of the lower limit of said square wave and current flows through said transformer primary in a second direction whereby the rotation of said motor is reversed in accordance with a periodicity defined by said pulses.

3. In a solid state reversing circuit of the character described in claim 2, wherein said square wave generating means includes a silicon controlled rectifier that is gated by said periodic pulses to define on-off times which determine the characteristics of said square wave.

4. A solid state reversing circuit adapted to be connected to a motor for reversing the direction of rotation of said motor by periodically reversing the direction of current flow of its power supply through its direction-control winding comprising, (1) A.C. bridge circuit means having its input adapted to be connected to said power supply and its output adapted to control the supply of current to said direction-control winding of said motor such that the direction of rotation of said motor is reversed when the current through said direction-control winding is reversed, (2) electronic bistable switch means connected in only one leg of said bridge circuit means such that in one of the two bistable states of said switch means said bridge circuit means is unbalanced in one sense and in the other of the two bistable states of said switch means said bridge circuit means is unbalanced in the other sense whereby the output of said bridge circuit means is reversed whenever said bistable switch means is switched from one of its bistable states to the other thereby reversing the direction of rotation of said motor, and (3) solid state electronic timing means connected to said bistable switch means for providing timing pulses whereby said bistable switch is switched from one condition to another and back for periodically reversing the direction of rotation of said motor.

References Cited

UNITED STATES PATENTS

| | | | |
|---|---|---|---|
| 3,032,697 | 5/1962 | Kirk | 318—293 |
| 3,095,534 | 6/1963 | Cockrell. | |
| 3,167,378 | 1/1965 | Talle | 318—256 X |
| 3,183,372 | 5/1965 | Chin. | |
| 3,188,544 | 6/1965 | Schweitzer | 318—257 |

BENJAMIN DOBECK, *Primary Examiner.*